United States Patent [19]

Kataoka et al.

[11] Patent Number: 6,090,903
[45] Date of Patent: Jul. 18, 2000

[54] PROPYLENE HOMOPOLYMER

[75] Inventors: Takuo Kataoka; Masayoshi Saito, both of Kanagawa, Japan

[73] Assignee: Toho Titanium Co., Ltd., Chigasaki, Japan

[21] Appl. No.: 08/952,962

[22] PCT Filed: Mar. 31, 1997

[86] PCT No.: PCT/JP97/01097

§ 371 Date: Dec. 4, 1997

§ 102(e) Date: Dec. 4, 1997

[87] PCT Pub. No.: WO97/38030

PCT Pub. Date: Oct. 16, 1997

[30] Foreign Application Priority Data

Apr. 4, 1996 [JP] Japan ..................... 8-108366

[51] Int. Cl.[7] .................................................. C08F 110/06
[52] U.S. Cl. .................. 526/351; 526/124.6; 526/125.3; 526/153; 526/128
[58] Field of Search ............................. 526/124.6, 125.3, 526/153, 128, 351

[56] References Cited

U.S. PATENT DOCUMENTS 5,518,973  5/1996  Miro et al. ............................. 502/125

FOREIGN PATENT DOCUMENTS 0 657 477  6/1994  European Pat. Off. .
0 172 869  5/1996  European Pat. Off. .
7-025946  1/1995  Japan .

OTHER PUBLICATIONS

*Processing Polyolefins on Single–Screw Extruders, Plastics Engineering*/ Jun. '91, pp.31–34.

*Primary Examiner*—David W. Wu
*Assistant Examiner*—Caixia Lu
*Attorney, Agent, or Firm*—Oblon, Spivak, McClelland, Maier & Neustadt, P.C.

[57] ABSTRACT

A propylene homopolymer having a high stereo-regularity and an excellent processability during sheet or film formation, characterized in that it exhibits a melt flow rate (MFR) of from 0.1 to 20 g/10 min., a xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \qquad (1)$$

wherein [Pmmmr], [Pmmrr] and [Pmrrm] are the relative intensity ratio (mol %) of Pmmmr, Pmmrr and Pmrrm, respectively, which are absorption intensities attributed to isoblock chain.

6 Claims, No Drawings

PROPYLENE HOMOPOLYMER

TECHNICAL FIELD

The present invention relates to a propylene homopolymer. More particularly, the present invention relates to a propylene homopolymer having less xylene-soluble component and an extremely high isoblock content in xylene-insoluble component.

TECHNICAL BACKGROUND

Many proposals have been made and known for a process for the polymerization of olefins in the presence of a catalyst formed by a solid catalyst component comprising a titanium halide compound, a magnesium compound and an electron donor compound as essential components, an organic aluminum compound and a third component such as silicon compound. Further, a process by which a crystalline polyolefin having a high stereoregularity can be obtained in the presence of such a catalyst in a high yield has been extensively studied.

For example, JP-A-63-3010 (The term "JP-A" as used herein means an "unexamined published Japanese patent application"), JP-A-1-221405, JP-A-1-315406, JP-A-3-227309, JP-A-3-70711, and JP-A-4-8709 disclose a process for the production of a polymer having a high stereoregularity in a high yield in the presence of an olefin polymerization catalyst formed by a solid catalyst component prepared from dialkoxymagnesium and titanium tetrachloride as main starting materials, an organic aluminum compound and a third component such as silicon compound.

Further, various proposals have been made for an olefin polymerization catalyst formed by (a) a solid catalyst component comprising a halogenated aluminum compound, a magnesium compound and a halogenated titanium compound as essential constituents, (b) an organic aluminum compound and (c) a third component such as organic acid ester and silicon compound. For example, JP-A-55-161807 proposes a catalyst formed by magnesium chloride, halogenated titanium, an organic acid ester, a halogenated hydrocarbon compound, and a halogenated aluminum compound. JP-A-61-31402 discloses a process for the preparation of a polymer having a high stereoregularity in a high yield in the presence of a catalyst prepared from (a) a solid catalyst component obtained by a process which comprises reacting (i) a reaction product of a halogenated aluminum compound with a silicon compound with (ii) a magnesium compound, and then reacting the reaction product with a halogenated titanium compound and a phthalic acid ester, (b) an organic aluminum compound and (c) a silicon compound.

The foregoing various techniques focus on the development of a catalyst component which is active enough to allow the omission of a so-called deashing step, i.e., step of removing catalyst residues such as chlorine and titanium remaining in the polymer produced by the polymerization of propylene in the presence of a catalyst as well as on the enhancement of the yield of a stereoregular polymer or the durability of the polymerization activity. These techniques can provide excellent results on these purposes.

Referring to propylene polymer, on the other hand, for example, JP-A-7-25946 discloses a propylene polymer having a high crystallinity of boiling n-heptane-insoluble component, a high stereoregularity and an extremely long meso run-length.

The propylene polymer obtained by the foregoing conventional techniques exhibits a high heat deformation temperature, a high melting point and a high crystallization temperature and thus exerts considerably good effects in respect to rigidity and heat resistance. Thus, the propylene polymer obtained by the foregoing conventional techniques can be utilized for various molding uses such as extrusion molding into sheet, film or the like, blow molding and injection molding. However, some problems have been still left unsolved in the molding of polypropylene. In particular, if the foregoing polymer having a high rigidity is subjected to extrusion molding into sheet, film or the like, some troubles can occur such as breaking during high speed molding and loss of transparency of the resulting molded product.

As a method for solving these problems there has been commonly known a method which comprises lowering the stereo-regularity of the propylene polymer and hence the energy required to work the propylene polymer. However, this solution is disadvantageous in that the quality of the resulting product can be rather deteriorated than improved because the propylene polymer contains a large amount of atactic propylene polymers. Examples of other solutions which have been attempted include a method which comprises allowing a small amount of ethylene in the polymerization system as a comonomer. Although this method makes it possible to control somewhat the crystallinity or density the resulting polymer, this method disadvantageously results in the complication of production process and the rise in the product cost and causes an undesirable phenomenon, i.e., rise in the percent occurrence of atactic polypropylene having an extremely low stereoregularity.

Moreover, in order to improve the transparency of propylene polymer, the addition of various nucleating agents to the propylene polymer produced is attempted in JP-A-2-265905 and JP-A-2-29444. However, this solution is disadvantageous in that the addition of nucleating agents causes the generation of odor during working. Further, since the nucleating agents thus added are insufficiently dispersed in the polymer, this solution leaves something to be desired in the improvement of transparency.

As mentioned above, these conventional techniques leave something to be desired in solution to the foregoing problems. It has thus been keenly desired to further develop a propylene homopolymer having a high stereoregularity which can be fairly worked into a sheet or film having an excellent quality.

DISCLOSURE OF THE INVENTION

The inventors made-extensive studies of the solution to the foregoing problems. As a result, a propylene homopolymer was found which has a high stereoregularity but a high isoblock content and thus can be fairly molded, in particular, into sheet or film. Thus, the present invention has been worked out.

The present invention concerns a novel propylene homopolymer, having a melt flow rate (MFR) of from 0.1 to 20 g/10 min., a xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \qquad (1)$$

wherein [Pmmmr], [Pmmrr] and [Pmrrm] are the relative intensity-ratio (mol %) of Pmmmr, Pmmrr and Pmrrm, respectively, which are absorption intensities attributed to isoblock chain. The propylene homopolymer of the present invention is particularly useful as a material for the production of sheet or film.

The present invention also concerns a propylene homopolymer, obtained by the polymerization of a propylene in the presence of a solid catalyst component (A) comprising as essential components magnesium, titanium, halogen and an electron donor, an organic aluminum compound (B) and an organic silicon compound (C), having a melt flow rate (MFR) of from 0.1 to 20 g/10 min., a xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \qquad (1)$$

wherein [Pmmmr], [Pmmrr] and [Pmrrm] are the relative intensity ratio (mol %) of Pmmmr, Pmmrr and Pmrrm, respectively, which are absorption intensities attributed to isoblock chain.

The present invention further concerns a propylene homopolymer, obtained by the polymerization of a propylene in the presence of a catalyst comprising the following components (A), (B) and (C), having a melt flow rate (MFR) of from 0.1 to 20 g/10 min., a xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \qquad (1)$$

wherein [Pmmmr], [Pmmrr] and [Pmrrm] are the relative intensity ratio (mol %) of Pmmmr, Pmmrr and Pmrrm, respectively, which are absorption intensities attributed to isoblock chain:

(A) A solid catalyst component prepared from the following components (a) to (d):

(a) A magnesium compound represented by the following general formula:

$$Mg(OR^1)_2$$

wherein $R^1$ represents a $C_{1-4}$ alkyl group or an aryl group;

(b) At least one aluminum compound selected from the group consisting of aluminum compounds represented by the following general formulae:

$$Al(OR^2)_m X^1_{3-m}$$

wherein $R^2$ represents a $C_{1-4}$ alkyl group or an aryl group; $X^1$ represents a halogen atom; and m represents a real number of from at least 0 to not more than 3;

$$R^3_n AlX^2_{3-n}$$

wherein $R^3$ represents a $C_{1-4}$ alkyl group; $X^2$ represents a hydrogen atom or halogen atom; and n represents a real number of from more than 0 to not more than 3;

(c) A titanium compound represented by the following general formula:

$$Ti(OR^4)_p X^3_{4-p}$$

wherein $R^4$ represents a $C_{1-4}$ alkyl group; $X^3$ represents a halogen atom; and p represents 0 or an integer of from 1 to 3; and (d) A diester of aromatic dicarboxylic acid;

(B) An organic aluminum compound represented by the following general formula:

$$R^5_q AlY_{3-q}$$

wherein $R^5$ represents a $C_{1-4}$ alkyl group; Y represents any one of hydrogen atom, chlorine atom, bromine atom and iodine atom; and q represents a real number of from more than 0 to not more than 3; and (C) An organic silicon compound represented by the following general formula:

$$R^6_r Si(OR^7)_{4-r}$$

wherein $R^6$'s may be the same or different and each represents a $C_{1-12}$ alkyl group, a cycloalkyl group, a phenyl group, a vinyl group, an allyl group or an aralkyl group; $R^7$'s may be the same or different and each represents a $C_{1-4}$ alkyl group, a cycloalkyl group, a phenyl group, a vinyl group, an allyl group or an aralkyl group; and r represents 0 or an integer of from 1 to 3.

Best Mode for Working the Invention

Embodiments of the present invention will be further described hereinafter.

The polypropylene homopolymer of the present invention is a polymer obtained by the polymerization of a propylene alone as a monomer and is distinguished from a copolymer obtained by the polymerization of a propylene in combination with a comonomer such as ethylene.

The polypropylene homopolymer of the present invention exhibits a melt flow rate of from 0.1 to 20 g/10 min., preferably from 0.3 to 15 g/10 min., more preferably from 0.5 to 10 g/10 min. Melt flow rate (MFR) is determined at a temperature of 230° C. under a load of 2.16 kg in accordance with JIS K6758.

Further, the polypropylene homopolymer of the present invention has a xylene-soluble component content of not more than 6.0% by weight, preferably from 2.0 to 5.0% by weight, more preferably from 3.0 to 5.0% by weight.

Moreover, the polypropylene homopolymer of the present invention has an isoblock content [IB] in xylene-insoluble component of at least 3 mol %, preferably from 3.5 to 20 mol %, more preferably from 3.5 to 10 mol %, though having a relatively high stereoregularity as mentioned above. The term "isoblock" as used herein is meant to indicate the crystalline structure of a polymer which has a single polymerized monomer unit defect in a polymer chain such that the methyl group (monomer unit defect) in propylene monomers polymerized as shown in the following formula are on a plane different from that of the methyl group in other polymerized propylene monomers. (In the following formula, Me represents methyl group (—CH₃)) Isoblock has other definitions such as stereoblock and atablock (J. E. Ewen, Journal of American Chemical Society 106, 6355 (1984)/V. Busico, Macromolecules 27, 4521 (1994)/V. Busico, Macromolecules 28, 1887 (1995)/T. Keiji, Y. Doi, Macromol. Chem. Rapid Commun. 2, 293 (1981)).

tion (weight-average molecular weight/number-average molecular weight) of the polymer. The greater the polydispersity index is, the better is the processability.

Further, the insoluble component content extracted with boiling n-heptane as an index of the stereoregularity of the propylene homopolymer of the present invention is preferably from 90.0 to 99.0% by weight, more preferably from 94.0 to 98.0% by weight, particularly from 94.5 to 97.4% by weight.

The process for the preparation of the propylene homopolymer of the present invention is not specifically limited. In practice, however, the propylene homopolymer

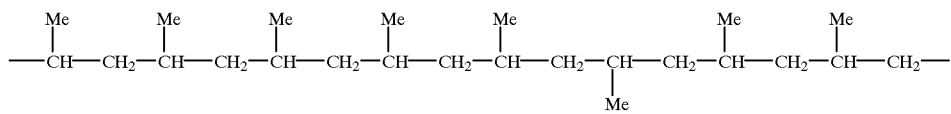

The m (meso) and r (racemi) conditions in the foregoing formula will be shown below. The structural units attributed to Pmmmr, Pmmrr and Pmrrm, which are absorption intensities in $^{13}$C-NMR spectrum, are (i), (ii) and (iii) shown in the following formula:

of the present invention can be prepared, e.g., by the polymerization of propylene in the presence of an olefin polymerization catalyst formed by a solid catalyst component (A) comprising as essential components magnesium, titanium, halogen and an electron donor, an organic alumi-

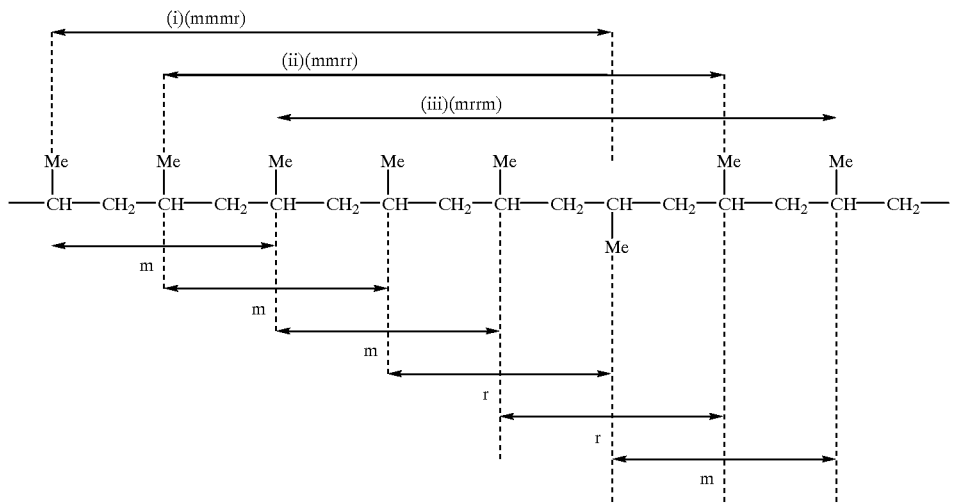

Accordingly, the isoblock content [IB] in the foregoing crystalline structure can be determined from the absorption intensities Pmmmr, Pmmrr and Pmrrm in $^{13}$C-NMR spectrum by the following equation (1):

[IB]=[Pmmmr]+[Pmmrr]+[Pmrrm] (1)

wherein [Pmmmr], [Pmmrr] and [Pmrrm] are relative intensity ratios (mol %) of Pmmmr, Pmmrr and Pmrrm, respectively, which are absorption intensities attributed to isoblock chain in $^{13}$C-NMR, to the sum of all the pentad absorption intensities (Pmmmm, Pmmmr, Prmmr, Pmmrr, Prmrr, Pmmrm, Prmrm, Prrrr, Pmrrr and Pmrrm)

The propylene homopolymer of the present invention exhibits a polydispersity index (PI) of preferably from 3.0 to 8.0, more preferably from 3.5 to 8.0, as determined by dynamic stress rheometer (DSR). The polydispersity index (PI) is a parameter related to the molecular weight distribunum compound (B) and an organic silicon compound (C). The various components constituting the olefin polymerization catalyst for use in the preparation of the propylene homopolymer of the present invention will be further described hereinafter.

The solid catalyst component (A) can be prepared by allowing a magnesium compound, a titanium compound and an electron donor to come in contact with each other. In some detail, the following components (a) to (d) may be used.

(a) A magnesium compound represented by the general formula:

wherein R¹ represents a C$_{1-4}$ alkyl group or an aryl group;

(b) At least one aluminum compound selected from the group consisting of aluminum compounds represented by the following general formulae:

$$Al(OR^2)_m X^1_{3-m}$$

wherein $R^2$ represents a $C_{1-4}$ alkyl group or an aryl group; $X^1$ represents a halogen atom; and m represents a real number of from at least 0 to not more than 3;

$$R^3_n AlX^2_{3-n}$$

wherein $R^3$ represents a $C_{1-4}$ alkyl group; $X^2$ represents a hydrogen atom or halogen atom; and n represents a real number of from more than 0 to not more than 3;

(c) A titanium compound represented by the following general formula:

$$Ti(OR^4)_p X^3_{4-p}$$

wherein $R^4$ represents a $C_{1-4}$ alkyl group; $X^3$ represents a halogen atom; and p represents 0 or an integer of from 1 to 3; and (d) A diester of aromatic dicarboxylic acid Examples of the magnesium compound (hereinafter occasionally referred to as "component (a)") represented by the general formula: $Mg(OR^1)_2$ (wherein two $R^1$'s may be the same or different and each represents a $C_{1-4}$ alkyl group or an aryl group) constituting the solid catalyst component (A) (hereinafter occasionally referred to as "component (A)") include dialkoxymagnesium and diaryloxymagnesium. In some detail, one or more of dimethoxymagnesium, diethoxymagnesium, di-n-propoxymagnesium, di-iso-propoxymagnesium, di-n-butoxymagnesium, di-iso-butoxymagnesium, diphenoxymagnesium, ethoxymethoxymagnesium, ethoxy-n-propoxymagnesium, n-butoxyethoxymagnesium, iso-butoxyethoxymagnesium, diphenoxymagnesium and the like can be used. Particularly preferred among these magnesium compounds are diethoxymagnesium and di-n-propoxymagnesium.

The dialkoxymagnesium to be used in the preparation of the solid catalyst component (A) herein may be used in granular or powder form. The particle shape of the dialkoxymagnesium may be irregular or spherical. If a spherical particle of dialkoxymagnesium is used, a polymer powder having a better particle shape and a narrower particle size distribution can be obtained. Thus, the polymer powder produced can be better handled during the polymerization, eliminating troubles such as blocking caused by the fine powder contained in the polymer powder produced.

The foregoing spherical particle of dialkoxymagnesium does not necessarily need to be round but may be ellipsoidal or pebble-like. In some detail, the sphericity of the particle is not more than 3, preferably from 1 to 2, more preferably from 1 to 1.5 as calculated in terms of ratio of major axis length l to minor axis length w (l/w).

Further, the foregoing dialkoxymagnesium may have an average particle diameter of from 1 µm to 200 µm, preferably from 5 µm to 150 µm.

The foregoing spherical particle of dialkoxymagnesium has an average particle diameter of from 1 µm to 100 µm, preferably from 5 µm to 50 µm, more preferably from 10 µm to 40 µm. Further, referring to its particle size, the foregoing spherical particle of compound preferably has a sharp particle size distribution comprising less fine powder or coarse powder. In some detail, the particle size distribution comprises particles having a particle size of not more than 5 µm in an amount of not more than 20%, preferably not more than 10%, and particles having a particle size of at least 100 µm in an amount of not more than 10%, preferably not more than 5%. The particle size distribution is not more than 3, preferably not more than 2, as calculated in terms of in (D90/D10) (wherein D90 represents the particle diameter at the point where the accumulated particle size reaches 90% and D10 represents the particle diameter at the point where the accumulated particle size reaches 10%).

The foregoing dialoxymagnesium does not necessarily need to be used as a starting material in the preparation of the solid catalyst component (A). For example, one obtained by the reaction of metallic magnesium with a $C_{1-4}$ aliphatic monohydric alcohol in the presence of a catalyst such as iodine may be used during the preparation of the solid catalyst component (A).

The aluminum compound to be used as a component (b) (hereinafter referred to as "component (b)") in the preparation of the solid catalyst component (A) herein comprises at least one selected from the group consisting of aluminum compounds represented by the following general formulae (I) and (II):

$$Al(OR^2)_m X^1_{3-m} \qquad (I)$$

wherein $R^2$ represents a $C_{1-4}$ alkyl group, an aryl group such as a phenyl group, or an aralkyl group having one or two $C_{1-3}$ alkyl groups substituted; the plurality of $R^2$'s, if m is 2 or more, may be the same or different; $X^1$ represents a halogen atom such as chlorine and bromine; and m represents a real number of at least 0 to not more than 3;

$$R^3_n AlX^2_{3-n} \qquad (II)$$

wherein $R^3$ represents a $C_{1-4}$ alkyl group; $X^2$ represents a hydrogen atom or halogen atom; and n represents a real number of from more than 0 to not more than 3, with the proviso that if n is 2 or more, the plurality of $R^3$'s may be the same or different.

Examples of the aluminum compound represented by the foregoing general formula (I) include aluminum trihalide, alkoxyaluminum dihalide, dialkoxyaluminum halide, and trialkoxyaluminum. Specific examples of these aluminum compounds include aluminum trichloride, aluminum tribromide, aluminum triiodide, diethoxyaluminum chloride, di-iso-propoxyaluminum chloride, dibutoxyaluminum chloride, ethoxyaluminum dichloride, iso-propoxyaluminum dichloride, butoxyaluminum dichloride, trimethoxyaluminum, triethoxyaluminum, tripropoxyaluminum, tri-iso-propoxyaluminum, tributoxyaluminum, and tri-iso-butoxyaluminum. Particularly preferred among these aluminum compounds are aluminum trichloride, di-iso-propoxyaluminum chloride, iso-propoxyaluminum dichloride, triethoxyaluminum, and tri-iso-propoxyaluminum.

Examples of the aluminum compound represented by the general formula (II) include trialkylaluminum, dialkylaluminum halide, and alkylaluminum dihalide. Specific examples of these aluminum compounds include triethylaluminum, tri-iso-butylaluminum, diethylaluminum hydride, di-iso-butyl hydride, diethylaluminum chloride, di-iso-butylaluminum chloride, ethylaluminum dichloride, propylaluminum dichloride, ethylaluminum sesquichloride, and butylaluminum sesquichloride. Particularly preferred among these aluminum compounds are triethylaluminum, diethylaluminum chloride, ethylaluminum dichloride, and ethylaluminum sesquichloride.

As the foregoing component (b) there may be used one or more selected from the group consisting of the foregoing compounds of the general formulae (I) and (II). The component (b) may be allowed to come in direct contact with other components or may be diluted with an organic solvent such as aromatic hydrocarbon (e.g., toluene, xylene) and aliphatic hydrocarbon (e.g., hexane, heptane) before use.

The component (c) to be used in the preparation of the solid catalyst component (A) is a titanium compound (hereinafter occasionally referred to as "component (c)") represented by the following general formula:

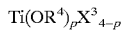

wherein $R^4$ represents a $C_{1-4}$ alkyl group; $X^3$ represents a halogen atom such as chlorine and bromine; p represents 0 or an integer of from 1 to 3, with the proviso that if p is 2 or more, the plurality of $R^4$'s may be the same or different. Examples of such a titanium compound include titanium tetrahalide and alkoxytitanium halide. Specific examples of the titanium tetrahalide include $TiCl_4$, $TiBr_4$, and $TiI_4$. Specific examples of the alkoxytitanium halide include $Ti(OCH_3)Cl_3$, $Ti(OC_2H_5)Cl_3$, $Ti(OC_3H_7)Cl_3$, $Ti(O—(n)C_4H_9)Cl_3$, $Ti(OCH_3)_2Cl_2$, $Ti(OC_2H_5)_2Cl_2$, $Ti(OC_3H_7)_2Cl_2$, $Ti(O—(n)C_4H_9)_2Cl_2$, $Ti(OCH_3)_3Cl$, $Ti(OC_2H_5)_3Cl$, $Ti(OC_3H_7)_3Cl$, and $Ti(O—(n)C_4H_9)_3Cl$. Preferred among these titanium compounds is titanium tetrahalide. Particularly preferred is $TiCl_4$. These titanium compounds may be used singly or in combination. The component (c) may be dissolved in and diluted with an organic solvent such as aromatic hydrocarbon (e.g., toluene, xylene) and aliphatic hydrocarbon (e.g., hexane, heptane) before use.

A particularly preferred example of the diester of aromatic dicarboxylic acid as the component (d) (hereinafter occasionally referred to as "component (d)") to be used for the preparation of the solid catalyst component (A) is a $C_{1-12}$ straight-chain or branched-chain alkyl diester of phthalic acid. Specific examples of such a diester of phthalic acid include dimethyl phthalate, diethyl phthalate, di-n-propyl phthalate, di-iso-propyl phthalate, di-n-butyl phthalate, di-iso-butyl phthalate, ethyl methyl phthalate, butyl ethyl phthalate, methyl (iso-propyl) phthalate, ethyl (n-propyl) phthalate, ethyl (n-butyl) phthalate, di-n-pentyl phthalate, di-iso-pentyl phthalate, di-n-hexyl phthalate, di-iso-hexyl phthalate, di-n-heptyl phthalate, di-iso-heptyl phthalate, di-n-octyl phthalate, bis(2-methylhexyl) phthalate, bis(2-ethylhexyl) phthalate, di-n-nonyl phthalate, di-iso-decyl phthalate, bis(2,2-dimethylheptyl) phthalate, n-butyl (iso-hexyl) phthalate, ethyl (iso-octyl) phthalate, n-butyl (iso-octyl) phthalate, n-pentyl (hexyl) phthalate, n-pentyl (iso-hexyl) phthalate, iso-pentyl (heptyl) phthalate, n-pentyl (iso-octyl) phthalate, n-pentyl (iso-nonyl) phthalate, iso-pentyl (n-decyl) phthalate, n-pentyl (undecyl) phthalate, iso-pentyl (iso-hexyl) phthalate, n-hexyl (iso-octyl) phthalate, n-hexyl (iso-nonyl) phthalate, n-hexyl (n-decyl) phthalate, n-heptyl (iso-octyl) phthalate, n-heptyl (iso-nonyl) phthalate, n-heptyl (neo-decyl) phthalate, and iso-octyl (iso-nonyl) phthalate. These diesters of phthalic acid may be used singly or in combination. Preferred among these diesters of phthalic acid are diethyl phthalate, di-n-butyl phthalate, di-iso-butyl phthalate, and bis(2-ethylhexyl) phthalate.

If two or more of these components (d) are used in combination, their combination is not specifically limited. If diesters of phthalic acid are used, their combination is preferably such that the difference in the sum of the number of carbon atoms contained in two alkyl groups between one diester of phthalic acid and the other is at least 4.

Specific examples of such a combination will be given below.

(1) Diethyl phthalate and di-n-butyl phthalate (2) Diethyl phthalate and di-iso-butyl phthalate
(3) Diethyl phthalate and di-n-octyl phthalate
(4) Diethyl phthalate and bis(2-ethylhexyl) phthalate
(5) Di-n-butyl phthalate and di-n-octyl phthalate
(6) Di-n-butyl phthalate and bis(2-ethylhexyl) phthalate
(7) Diethyl phthalate, di-n-butyl phthalate and bis(2-ethylhexyl) phthalate
(8) Diethyl phthalate, di-iso-butyl phthalate and bis(2-ethylhexyl) phthalate Besides the foregoing components, a polysiloxane (hereinafter occasionally referred to as "component (e)") may be used in the preparation of the solid catalyst component (A). As such a polysiloxane there may be used one or more polysiloxanes (hereinafter occasionally referred to as "component (e)") represented by the following general formula:

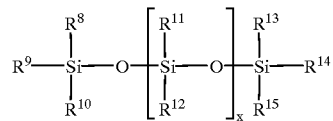

wherein x represents an average polymerization degree of from 2 to 30,000; $R^8$ to $R^{15}$ each is mainly composed of methyl group and may be partially substituted by a phenyl group, hydrogen, a higher aliphatic acid residue, an epoxy-containing group or a polyoxyalkylene group. In the compound of the foregoing general formula, $R^{11}$ and $R^{12}$ may form a cyclic polysiloxane of methyl group. One or more polysiloxanes (hereinafter occasionally referred to as "component (e)") represented by the above general formula may be used.

The foregoing polysiloxane, generically known as "silicon oil", is a chain-like, partly hydrogenated, cyclic or modified polysiloxane having a viscosity of from 2 to 10,000 centistokes, preferably from 2 to 1,000 centistokes, more preferably from 3 to 500 centistokes at a temperature of 25° C., which stays liquid or viscous at ordinary temperature.

Examples of the chain-like polysiloxane include dimethylpolysiloxane, and methylphenylpolysiloxane. Examples of the partly hydrogenated polysiloxane include methylhydrogenpolysiloxane having a percent hydrogenation of from 10 to 80%. Examples of the cyclic polysiloxane include hexamethylcyclotrisiloxane, octamethylcyclotetrasiloxane, decamethylcyclopentanesiloxane, 2,4,6-trimethylcyclotrisiloxane, and 2,4,6,8-tetramethylcyclotetrasiloxane. Examples of the modified polysiloxane include $C_{6-30}$ higher aliphatic acid-substituted dimethylsiloxane, epoxy group-substituted dimethylsiloxane, and polyoxyalkylene group-substituted dimethylsiloxane.

Specific examples of these polysiloxanes include TSF400, TSF401, TSF404, TSF405, TSF4045, TSF410, TSF411, TSF433, TSF437, TSF4420, TSF451-5A, TSF451-10A, TSF451-10A, TSF451-50A, TSF451-100, TSF483, and TSF484 [available from Toshiba Silicone Co., Ltd.], and KF96, KF96L, KF96H, KF69, KF92, KF961, KF965, KF56, KF99, KF94, KF995, KF105, KF351, HIVAC-F4, and HIVAC-F5 [available from Shin-Etsu Chemical Co., Ltd.].

Such a polysiloxane may be used in the form of solution in an organic solvent such as toluene, xylene, hexane and heptane.

The solid catalyst component (A) may be prepared by allowing the components (a), (b), (c), (d) and optionally (e)

to come into contact with one another. This contact process can proceed in the absence of inert organic solvent but preferably in the presence of the foregoing organic solvent taking into account the ease of operation. Examples of the inert organic solvent employable herein include saturated hydrocarbon such as hexane, heptane and cyclohexane, aromatic hydrocarbon such as benzene, toluene, xylene and ethylbenzene, and halogenated hydrocarbon such as orthodichlorobenzene, methylene chloride, carbon tetrachloride and dichloroethane. In particular, aromatic hydrocarbons having a boiling point of from about 90° C. to about 150° C. are preferred. Specific examples of such aromatic hydrocarbons include toluene, xylene, and ethylbenzene.

Referring to the proportion of the various components, the proportion of the component (b) is from 0.01 to 10 g, preferably from 0.05 to 2.0 g per 1 g of the component (a). The proportion of the component (c) is from 0.01 to 200 ml, preferably from 0.5 to 100 ml per 1 g of the component (a). The proportion of the component (d) is from 0.01 to 1.0 g, preferably from 0.1 to 0.5 g per 1 g of the component (a). The proportion of the optional component (e) is from 0.01 to 5.0 g, preferably from 0.05 to 1.0 g per 1 g of the component (a). The amount of the inert organic solvent to be used is not specifically limited but is preferably from 0.1 to 10 times by volume that of the component (c) taking into account problems in handling. These components each may be added batchwise during contact. Alternatively, one or more kinds of these components may be selected and used.

The contact of these components may be effected in an atmosphere of inert gas free of water or the like with stirring in a vessel equipped with an agitator. The contact of these components may be effected at a relatively low temperature in the vicinity of room temperature if they are merely stirred and mixed or subjected to dispersion or suspension to undergo modification. If these components are reacted after contacted to obtain a reaction product, the contact is preferably effected within a temperature range of from 40° C. to 130° C. If the reaction temperature falls below 40° C., the reaction cannot proceed sufficiently, resulting in the production of a solid catalyst component having insufficient properties. On the contrary, if the reaction temperature exceeds 130° C., the solvent used remarkably evaporates, making it difficult to control the reaction. The reaction time is at least 1 minute, preferably at least 10 minutes, more preferably at least 30 minutes.

In order to prepare the solid catalyst component (A), the component (a), the component (b), the component (c), the component (d), and the optional component (e) are contacted with one another. The order of contact of these components is not specifically limited but is arbitrary. Specific examples of the procedure of contact of these components will be given below. 1. The components (a), (b), (c) and (d) are allowed to come in contact with one another at the same time. 2. The component (c) is repeatedly allowed to come in contact with a solid reaction product obtained by allowing the components (a), (b), (c) and (d) to come in contact with one another. 3. The component (d) is repeatedly allowed to come in contact with a solid reaction product obtained by previously allowing the components (a), (b) and (c) to come in contact with one another. 4. The component (d) is allowed to come in contact with a solid reaction product obtained by previously allowing the components (a), (b) and (c) to come in contact with one another. The component (c) is then repeatedly allowed to come in contact with the reaction product. 5. The component (b) is allowed to come in contact with a solid reaction product obtained by previously allowing the components (a), (c) and (d) to come in contact with one another. 6. The component (b) is allowed to come in contact with a solid reaction product obtained by previously allowing the components (a), (c) and (d) to come in contact with one another. The component (c) is then repeatedly allowed to come in contact with the reaction product. 7. The component (b) is allowed to come in contact with a solid reaction product obtained by previously allowing the components (a), (c) and (d) to come in contact with one another. The components (b) and (c) are then repeatedly allowed to come in contact with the reaction product. 8. The components (b) and (c) are repeatedly allowed to come in contact with a solid reaction product obtained by previously allowing the components (a), (b), (c) and (d) to come in contact with one another. 9. The components (a), (b), (c), (d) and (e) are allowed to come in contact with one another at the same time. 10. The component (c) is repeatedly allowed to come in contact with a solid reaction product obtained by allowing the components (a), (b), (c), (d) and (e) to come in contact with one another. 11. The components (d) and (e) are allowed to come in contact with a solid reaction product obtained by previously allowing the components (a), (b) and (c) to come in contact with one another. 12. The components (d) and (e) are allowed to come in contact with a solid reaction product obtained by previously allowing the components (a), (b) and (c) to come in contact with one another. The component (c) is then repeatedly allowed to come in contact with the reaction product. 13. The component (b) is allowed to come in contact with a solid reaction product obtained by previously allowing the components (a), (c), (d) and (e) to come in contact with one another. 14. The component (b) is allowed to come in contact with a solid reaction product obtained by previously allowing the components (a), (c), (d) and (e) to come in contact with one another. The component (c) is then repeatedly allowed to come in contact with the reaction product. 15. The component (b) is allowed to come in contact with a solid reaction product obtained by previously allowing the components (a), (c), (d) and (e) to come in contact with one another. The components (b) and (c) are then repeatedly allowed to come in contact with the reaction product. 16. The components (b) and (c) are repeatedly allowed to come in contact with a solid reaction product obtained by previously allowing the components (a), (b), (c), (d) and (e) to come in contact with one another.

The order of the contact of the component (e) among the various components is arbitrary. In practice, however, it is preferred that the component (e) be allowed to come in contact with a solid reaction product obtained by previously allowing the components (a), (c) and (d) to come in contact with one another to reduce the fine powder content in the polymer while maintaining a high activity, a high stereoregularity and a predetermined isoblock content. During the foregoing contact, the component (b) and/or component (c) is allowed to come in contact with the solid reaction product within a temperature of from 40 to 130° C. for 1 minute or longer, preferably for 10 minutes or longer, more preferably 30 minutes or longer. In this procedure, the components (b) and (c) may be added to the reaction product directly or in the form of solution obtained by properly diluting with the foregoing inert organic solvent. The latter method is preferred. In another preferred embodiment, the solid reaction product obtained by the prestage contact and reaction may be washed with the foregoing inert organic solvent, and then repeatedly allowed to come in contact with the component (b) and/or component (c).

Specific examples of the process for the preparation of the solid catalyst component (A) will be described hereinafter.

1. Diethoxymagnesium as the component (a) and aluminum trichloride as the component (b) are suspended in an aromatic hydrocarbon solvent such as toluene within a temperature range of from −10° C. to 30° C. To the suspension thus obtained is then added titanium tetrachloride as the component (c). In this procedure, the amount of titanium tetrachloride is preferably not more than ½ by volume of the solvent in which the component (a) is suspended. The suspension is heated to a temperature of from 40° C. to 100° C. wherein dibutyl phthalate is then added thereto as the component (d). Subsequently, diethyl phthalate is added to the suspension within a temperature range of from 60 to 80° C. Subsequently, to the suspension is added dimethylpolysiloxane as the component (e). The suspension is heated to a temperature of from 100 to 120° C. where it is then kept for 30 minutes to 3 hours to undergo reaction to obtain a solid reaction product. The solid reaction product is washed with titanium tetrachloride diluted with toluene, and then washed with toluene within a temperature range of from 40° C. to 130° C. for 1 minute or longer. To the solid reaction product are then added toluene and titanium tetrachloride so that they are allowed to come in contact with the solid reaction product. The reaction system is heated to a temperature of from 100° C. to 120° C. where it is then kept to undergo reaction for 30 minutes to 3 hours. Aluminum trichloride may be again added to the reaction product as the component (b). Finally, the solid reaction product is washed with heptane to obtain a solid catalyst component (A).

(2) Diethoxymagnesium is suspended as the component (a) in an aromatic hydrocarbon solvent such as toluene within a temperature range of from −10° C. to 30° C. To the suspension thus obtained is added titanium tetrachloride as the component (c). In this procedure, the amount of titanium tetrachloride is preferably not more than ½ by volume of the solvent in which the component (a) is suspended. Subsequently, to the suspension is added di-iso-octyl phthalate as the component. (d) within a temperature range of from 30° C. to 60° C. Further, to the suspension is added diethyl phthalate within a temperature range of from 60° C. to 80° C. Subsequently, the suspension is heated to a temperature of from 80° C. to 100° C. where dimethylpolysiloxane is then added thereto as the component (e). The mixture is further heated to a temperature of from 100° C. to 120° C. where it is then kept to undergo reaction for 30 minutes to 3 hours to obtain a solid reaction product. The solid reaction product is washed with titanium tetrachloride diluted with toluene and then with toluene within a temperature range of from 40° C. to 130° C. for 1 minute or longer. To the resulting solid reaction product is then added aluminum trichloride as the component (b) so that it is allowed to come in contact with the solid reaction product. In this procedure, it is preferred that the component (b) be added for contact in the form of solution in an organic solvent such as toluene so that it is allowed to undergo uniform contact. Further, to the solid reaction product is added titanium tetrachloride. The reaction system is heated to a temperature of from 100° C. to 120° C. where it is then kept to undergo reaction for 30 minutes to 3 hours. The solid reaction product is washed with heptane to obtain a solid catalyst component (A).

The solid catalyst component (A) of the present invention thus prepared is preferably then washed with an inert organic solvent such as heptane to remove unreacted substances therefrom. The solid catalyst component (A) thus washed is then combined with the components (B) and (C) described later after dried or directly to form an olefin polymerization catalyst of the present invention.

As the organic aluminum compound (B) constituting the olefin polymerization catalyst there may be used an organic aluminum compound represented by the following general formula:

$$R^5_q AlY_{3-q}$$

wherein $R^5$ represents a $C_{1-4}$ alkyl group; Y represents hydrogen atom, chlorine atom, bromine atom or iodine atom; and q represents a real number of from more than 0 to not more than 3, with the proviso that if q is 2 or more, the plurality of $R^5$'s may be the same or different.

Examples of the organic aluminum compound (B) include triethylaluminum, diethylaluminum chloride, tri-iso-butylaluminum, diethylaluminum bromide, and ethylaluminum hydride. These organic aluminum compounds may be used singly or in combination of two or more thereof. Preferred among these organic aluminum compounds are triethylaluminum and tri-isobutylaluminum.

As the organic silicon compound (C) constituting the olefin polymerization catalyst there may be used an organic silicon compound represented by the following general formula:

$$R^6_r Si(OR^7)_{4-r}$$

wherein $R^6$'s may be the same or different and each represents a $C_{1-12}$ alkyl group, a cycloalkyl group (preferably cycloalkyl groups having from 3 to 6 carbon atoms), a phenyl group, a vinyl group, an allyl group or an aralkyl group; $R^7$'s may be the same or different and each represents a $C_{1-4}$ alkyl group, a cycloalkyl group, a phenyl group, a vinyl group, an allyl group or an aralkyl group; and r represents 0 or an integer of from 1 to 3.

Examples of the organic silicon compound (C) include phenylalkoxysilane, alkylalkoxysilane, phenylalkylalkoxysilane, cycloalkylalkoxysilane, cycloalkylalkylalkoxysilane, and alkoxysilane.

Specific examples of the foregoing organic silicon component (C) include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, t-butylmethyldimethoxysilane, t-butylethyldimethoxysilane, di-n-butyldiethoxysilane, n-butylmethyldimethoxysilane, bis(2-ethylhexyl) dimethoxysilane, bis(2-ethylhexyl)diethoxysilane, dicyclohexyldimethoxysilane, dicyclohexyldiethoxysilane, dicyclopentyldimethoxysilane, dicyclopentyldiethoxysilane, cyclohexylmethyldimethoxysilane, cyclohexylmethyldiethoxysilane, cyclohexylethyldimethoxysilane, cyclohexyl(iso-propyl) dimethoxysilane, cyclohexylethyldiethoxysilane, cyclopentylmethyldimethoxysilane, cyclopentylmethyldiethoxysilane, cyclopentylethyldiethoxysilane, cyclopentyl(iso-propyl) dimethoxysilane, cyclohexyl(n-pentyl)dimethoxysilane, cyclohexyl(n-pentyl)diethoxysilane, cyclopentyl(iso-butyl) dimethoxysilane, cyclohexyl(n-propyl)dimethoxysilane, cyclohexyl(n-propyl)diethoxysilane, cyclohexyl(iso-propyl) diethocysilane, cyclohexyl(n-butyl)dimethoxysilane, cyclohexyl(n-butyl)diethoxysilane, cyclohexyl(iso-butyl) dimethoxysilane, diphenyldimethoxysilane, diphenyldiethoxysilane, phenylmethyldimethoxysilarie, phenylmethyldiethoxysilane, phenylethyldimethoxysilane, phenylethyldiethoxysilane, cyclohexyldimethylmethoxysilane, cyclohexyldimethylethoxysilane, cyclohexyldiethylmethoxysilane, cyclohexyldiethylethoxysilane, 2-ethylhexyltrimethoxysilane, 2-ethylhexyltriethoxysilane, methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, n-butyltrimethoxysilane, iso-butyltrimethoxysilane, t-butyltrimethoxysilane, n-butyltriethoxysilane, cyclohexyltrimethoxysilane, cyclohexyltriethoxysilane, cyclopentyltrimethoxysilane, cyclopentyltriethoxysilane, vinyltrimethoxysilane, vinyltriethoxysilane, 2-ethylhexyltrimethoxysilane, 2-ethylhexyltriethoxysilane, phenyltrimethoxysilane, phenyltriethoxysilane, tetramethoxysilane, tetraethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, bis(3-methylcyclohexyl)dimethoxysilane, 4-methylcyclohexylcyclohexyldimethoxysilane, bis(4-methylcyclohexyl)dimethoxysilane, 3,5-dimethoxycyclohexylcyclohexyldimethoxysilane, bis(3,5-dimethylcyclohexyl)dimethoxysilane, tetramethoxysilane, and tetraethoxysilane.

Preferred among these organic silicon compounds are di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, 3,5-dimethylcyclohexylcyclopentyldimethoxysilane, and tetra-ethoxysilane. These organic silicon compounds (C) may be used singly or in combination.

In the preparation of the propylene homopolymer of the present invention, the polymerization of propylene is effected in the presence of a catalyst made of the foregoing solid catalyst component (A), organic aluminum compound (B) and organic silicon compound (C). The ratio of the various components to be used is arbitrary and not specifically limited unless the effects of the present invention are impaired. In general, the proportion of the organic aluminum compound (B) is from 1 to 1,000 mols, preferably from 50 to 500 mols per mol of titanium atom in the solid catalyst component (A). The proportion of the organic silicon compound (C) is from 0.001 to 2 mols, preferably from 0.01 to 0.5 mols per mol of the component (B).

The foregoing catalyst is formed by the foregoing solid catalyst component (A), organic aluminum compound (B) and organic silicon compound (C). As the electron donor (external electron donor) to be used during polymerization there may be used an organic compound capable of containing oxygen or nitrogen in combination with the foregoing organic silicon compound (C). Specific examples of such an organic compound include alcohols, phenols, ethers, esters, ketones, acid halides, aldehydes, amines, amides, nitriles, and isocyanates.

Specific examples of these organic compounds include alcohols such as methanol, ethanol, propanol, butanol, pentanol, hexanol, octanol, 2-ethylhexanol and dodecanol, phenols such as phenol and cresol, ethers such as methyl ether, ethyl ether, propyl ether, butyl ether, amyl ether and diphenyl ether, monocarboxylic acid esters such as methyl formate, ethyl acetate, vinyl acetate, propyl acetate, octyl acetate, cyclohexyl acetate, ethyl propionate, ethyl butyrate, methyl benzoate, ethyl benzoate, propyl benzoate, butyl benzoate, octyl benzoate, cyclohexyl benzoate, phenyl benzoate, methyl p-toluylate, ethyl p-toluylate, p-methoxyethyl benzoate, p-ethoxyethyl benzoate, methyl anisate and ethyl anisate, dicarboxylic acid esters such as diethyl maleate, dibutyl maleate, dimethyl adipate, diethyl adipate, dipropyl adipate, dibutyl adipate, dimethyl adipate, diisodecyl adipate, dioctyl adipate, diethyl phthalate, dipropyl phthalate, dibutyl phthalate, dipentyl phthalate, dihexyl phthalate, diheptyl phthalate, dioctyl phthalate, dinonyl phthalate and didecyl phthalate, ketones such as acetone, methyl ethyl ketone, methyl butyl ketone, acetophenone and benzophenone, acid halides such as phthalic acid dichloride and terephthalic acid dichloride, aldehydes such as acetaldehyde, propionaldehyde, octylaldehyde and benzaldehyde, amines such as methylamine, ethylamine, tributylamine, piperidine, aniline and pyridine, amides such as acetamide and acrylamide, and nitriles such as acetonitrile, benzonitrile and tolunitrile.

The polymerization of propylene in the presence of the catalyst made of the foregoing solid catalyst component (A), organic aluminum compound (B) and organic silicon compound (C) (also referred to as "main polymerization") is preferably preceded by prepolymerization of propylene to further enhance the catalytic activity and the stereoregularity and particle properties of the polymer thus produced.

In the foregoing prepolymerization, the foregoing solid catalyst component (A) is used in combination with a portion of the foregoing organic aluminum compound (B). In this procedure, the whole or a portion of the foregoing organic silicon compound (C) may be used in combination with these components. The order of contact of the various components during the prepolymerization is arbitrary. In a preferred embodiment, the organic aluminum compound (B) is charged into the prepolymerization system. Subsequently, the organic aluminum compound (B) is allowed to come in contact with the solid catalyst component (A) and then with propylene. In the case where the prepolymerization is effected with the organic silicon compound (C) as well, the organic aluminum compound (B) is charged into the prepolymerization system. Subsequently, the organic aluminum compound (B) is allowed to come in contact with the organic silicon compound (C) and then with the solid catalyst component (A), and eventually with propylene.

The prepolymerization of propylene is effected with the foregoing combination of catalyst components in the presence of an inert hydrocarbon solvent. Examples of the inert hydrocarbon solvent employable herein include propane, butane, heptane, hexane, octane, decane, dodecane, cyclohexane, benzene, toluene, xylene, and mineral oil. Preferred among these inert hydrocarbon solvents is an aliphatic hydrocarbon such as hexane and heptane.

The foregoing prepolymerization is effected in an atmosphere of inert gas such as nitrogen and argon or propylene. In the case where the prepolymerization is effected in the presence of the foregoing inert hydrocarbon solvent, a small amount of propylene is previously dissolved in the solvent. In some detail, propylene is dissolved in the inert hydrocarbon solvent in an amount of from 0.01 to 1.0 g, preferably from 0.03 to 0.5 g, more preferably from 0.05 to 0.3 g per g of the solid catalyst component (A). In this procedure, the amount of propylene to be dissolved in the solvent is from 1 to 50%, preferably from 3 to 30%, more preferably from 5 to 15% of the amount of the polymer to be eventually produced in the prepolymerization. As mentioned above, propylene is dissolved in the solvent. To the solution are then added the organic aluminum compound (B) and optionally the organic silicon compound (C). Subsequently, to the mixture is added the solid catalyst component (A) so that these components are allowed to come in contact with one another. The mixture is then allowed to come in contact with a predetermined amount of propylene to effect prepolymerization.

In the foregoing prepolymerization process, it is preferred that the organic aluminum compound (B) be used in an amount less than that of the organic aluminum compound (B) to be used in the main polymerization, i.e., from 0.5 to 50 mols, preferably from 1 to 25 mols, more preferably from 2 to 10 mols per titanium atom in the solid catalyst component (A). The amount of the organic silicon compound (C) to be possibly used in the prepolymerization is from 0 to 10 mols, preferably from 0 to 5 mols, more preferably from 0 to 1 mol per titanium atom in the solid catalyst component (A).

The concentration of the solid catalyst component (A) to be used in the prepolymerization is desirably from 0.01 to 50 g, preferably from 0.05 to 30 g, more preferably from 0.1 to 15 g per l of the foregoing inert hydrocarbon solvent. The prepolymerization temperature is from 0° C. to 40° C., preferably from 5° C. to 35° C., more preferably from 10° C. to 30° C. The prepolymerization reaction time may be long enough to produce a predetermined amount of the polymer. In practice, it is normally from 0.1 to 10 hours, preferably from 0.5 to 2 hours. Further, the prepolymerization is preferably effected in such a manner that a polymer is produced in an amount of from 1 to 20 g, preferably from 1.5 to 15 g, more preferably from 2 to 10 g per g of the solid catalyst component (A).

The foregoing prepolymerization is followed by the main polymerization of propylene in the presence of a polymerization catalyst formed by the prepolymerization catalyst, organic aluminum compound (B) and organic silicon compound (C).

The polymerization is carried out by slurry polymerization, liquid polymerization or gas phase polymerization. During the polymerization, hydrogen may be used as a molecular weight controller. The polymerization temperature is not higher than 200° C., preferably not higher than 100° C. The polymerization pressure is not higher than 10 MPa, preferably not higher than 5 MPa, more preferably not higher than 3 MPa.

The propylene homopolymer of the present invention thus obtained may comprise various additives which are incorporated in ordinary propylene polymers, such as oxidation inhibitor, anti-static agent, lubricant, ultraviolet absorber, light stabilizer, fire retardant, anti-blocking agent and filler, as necessary.

The propylene homopolymer of the present invention may be used as a starting material of injection-molded article, unoriented film, oriented film, oriented sheet, etc. produced by injection molding, extrusion molding, blow molding, orientation, etc. In particular, the propylene homopolymer of the present invention can be fairly formed into a sheet or film. The sheet forming can be accomplished by T-die roll forming method, inflation method, etc. The film forming can be accomplished by air-cooled inflation method, two-stage air-cooled inflation method, T-die film forming method, water-cooled inflation method, etc. Thus, the propylene homopolymer of the present invention can be worked into a sheet or film excellent in transparency, anti-blocking properties, etc.

The xylene-soluble component (XS), isoblock content (IB) in xylene-insoluble component and polydispersity index (PI) were determined by the following methods.

(1) Method for Measuring Xylene-soluble Component 4.0 g of the polymer was dissolved in 200 ml of paraxylene at boiling point (138° C.) in 2 hours. The solution thus obtained was then allowed to cool to a temperature of 23° C. The soluble component and the insoluble component were separated from each other by filtration. The soluble component thus separated was then heated and dried to obtain a polymer as xylene-soluble component (XS) (% by weight).

(2) Method for Measuring Isoblock Content in Xylene-insoluble Component by $^{13}$C-NMR Spectrum The insoluble component obtained in the method (1) was dried to obtain a polymer which was then measured for isoblock content. The measurement of isoblock content was accomplished by means of JNM-GSX270 available from JEOL Ltd.

The signals of Pmmmr, Pmmrr and Pmrrm, which are absorption intensities attributed to isoblock chain in $^{13}$C-NMR spectrum in xylene-insoluble component, were assigned according to A. Zambellis et al., "Macromolecules", 13, 267, (1980). The measurement conditions are given below.

Measurement mode: Proton decoupling method (SGBCM)

Pulse angle: 45° (8.25 $\mu$s)

Pulse repetition time: 7 seconds

Number of integrations: 10,000

Solvent: 70: 30 (% by volume) mixture of 1,2,4-trichlorobenzene an heavy benzene Internal standard: Hexamethyldisiloxane Sample concentration for measurement: 200 mg/3.0 ml solvent Measurement temperature: 120° C.

(3) Method for Measuring Polydispersity Index (PI) by DSR

The polydispersity index (PI) was measured by means of a Type SR-500 dynamic stress rheometer (DSR) available from RHEOMETRICS Inc. under the following conditions. The sample comprised compounding additives incorporated therein to inhibit the thermal deterioration thereof.

Measurement mode: Frequency sweep

Measurement temperature: 200° C.

Measurement stress: 2,000 dyn/cm$^2$

Measurement frequency range: 100 to 0.1 rad/sec.
Compounding additives:

| | |
|---|---|
| 2,6-Di-t-butyl-p-cresol | 4 g |
| DLTP (Lasmit) | 8 g |
| Calcium stearate | 2 g |
| Mark 260 (adecastab) | 6 g |
| Acetone | 200 ml |

These compounding agents were mixed to give a slurry which is then incorporated in the polymer.

Mixing ratio: 5 ml of compounding agents (slurry) per 5 g of polymer

The present invention will be further described in the following examples and comparative examples.

EXAMPLE 1

<Preparation of Solid Catalyst Component>

Into a 500-ml round flask equipped with an agitator in which the air within had been thoroughly replaced by nitrogen gas were charged 10 g of diethoxymagnesium, 1.5 g of aluminum trichloride and 90 ml of toluene to make a suspension. Into the flask was then charged 22 ml of titanium tetrachloride of room temperature. The reaction system was heated with stirring to a temperature of 80° C. where it was then reacted. Subsequently, to the reaction system were added 3.3 ml of di-n-butyl phthalate and 3.0 ml of a dimethylpolysiloxane which has a viscosity of 50 cSt at room temperature. The reaction system was further heated to a temperature of 110° C. where it was then reacted for 2 hours. After the termination of the reaction, the supernatant solution was removed. The resulting reaction product was then washed with 88 ml of toluene at a temperature of 75° C. three times. Thereafter, to the reaction system were added 89 ml of toluene and 22 ml of titanium tetrachloride. The reaction system was then processed with stirring at a temperature of 100° C. for 1.5 hours. Subsequently, the resulting product was washed with 83 ml of n-heptane of 40° C. 8 times to obtain a solid catalyst component. The solid catalyst component was then measured for Ti content. The results were 3.3% by weight. The solid catalyst component also exhibited Al content of 0.5% by weight.

<Preparation of Polymerization Catalyst and Polymerization>

Into a 1,800 ml stainless steel autoclave equipped with an agitator in which the air within had been thoroughly dried with nitrogen gas and then replaced by propylene gas was charged 700 ml of n-heptane. Into the autoclave were then charged 2.10 mmol of triethylaluminum, 0.21 mmol of cyclohexylmethyldimethoxysilane and the foregoing solid catalyst component in an amount of 0.0053 mmol as calculated in terms of Ti while being kept in an atmosphere of propylene gas to form a polymerization catalyst. Subsequently, the reaction system was subjected to prepolymerization at a temperature of 20° C. with stirring under a propylene pressure of 0.2 MPa for 30 minutes. Thereafter, into the autoclave was charged 80 ml of hydrogen to raise the propylene pressure in the system to 0.7 MPa where the reaction system was then subjected to polymerization at a temperature of 70° C. for 2 hours. The pressure drop caused by the progress of polymerization was made up for by continuously supplying propylene alone. In this manner, the reaction system pressure was kept to a predetermined value during polymerization. In accordance with the foregoing polymerization process, propylene was polymerized. The polymer thus produced was withdrawn by filtration, and then dried under reduced pressure to obtain a solid polymer.

Separately, the filtrate was condensed to obtain a polymer dissolved in a polymerization solvent. The amount of the polymer thus obtained is (A). The amount of the solid polymer is (B). The solid polymer thus obtained was extracted with boiling n-heptane for 6 hours to obtain a polymer insoluble in n-heptane. The amount of the polymer thus obtained is (C).

The polymerization activity (Y) per solid catalyst component is represented by the following equation:

$$(Y)=[(A)+(B)](g)/\text{amount of solid catalyst component (g)}$$

The boiling n-heptane-insoluble component content (HI) is represented by the following equation:

$$(HI)=(C)(g)/(B)(g)$$

Further, the solid polymer (B) thus produced was measured for melt flow rate (MFR), bulk density (BD), xylene-soluble component (XS), isoblock content (IB) in xylene-insoluble component and polydispersity index (PI). The results are set forth in Table 1.

EXAMPLE 2

<Preparation of Solid Catalyst Component>

Into a 500-ml round flask equipped with an agitator in which the air within had been thoroughly replaced by nitrogen gas were charged 10 g of diethoxymagnesium, 1.0 g of aluminum trichloride and 90 ml of toluene to make a suspension. Into the flask was then charged 20 ml of titanium tetrachloride of room temperature. The reaction system was heated with stirring to a temperature of 50° C. where it was then reacted. Subsequently, to the reaction system was added 4.5 ml of di-iso-octyl phthalate. The reaction system was further heated to a temperature of 110° C. where 4.0 ml of a dimethylpolysiloxane which has a viscosity of 50 cSt at room temperature was then added thereto. The reaction mixture was then reacted for 2 hours. After the termination of the reaction, the supernatant solution was removed. The resulting reaction product was then washed with 88 ml of toluene at a temperature of 75° C. three times. Thereafter, to the reaction system were added 80 ml of toluene, 1.0 g of aluminum trichloride and 30 ml of titanium tetrachloride. The reaction system was then reacted with stirring at a temperature of 105° C. for 2 hours. Subsequently, the resulting product was washed with 80 ml of n-heptane of 40° C. 8 times to obtain a solid catalyst component. The solid catalyst component was then measured for Ti content. The results were 2.9% by weight. The solid catalyst component also exhibited Al content of 0.8% by weight.

<Preparation of Polymerization Catalyst and Polymerization>

The propylene polymerization procedure of Example 1 was followed except that diphenyldimethoxysilane was used instead of cyclohexylmethyldimethoxysilane. The propylene homopolymer thus obtained was then evaluated. The results are set forth in Table 1.

EXAMPLE 3

<Preparation of solid catalyst component>

Into a 500-ml round flask equipped with an agitator in which the air within had been thoroughly replaced by nitrogen gas were charged 10 g of diethoxymagnesium, 0.8 g of aluminum trichloride and 90 ml of toluene to make a suspension. Into the flask was then charged 22 ml of titanium tetrachloride of room temperature. The reaction system was heated with stirring to a temperature of 80° C. where it was then reacted. Subsequently, to the reaction system was added 4.8 ml of di-iso-octyl phthalate. The reaction system was further heated to a temperature of 110° C. where 6.0 ml of a dimethylpolysiloxane which has a viscosity of 100 cSt at room temperature was then added thereto. The reaction mixture was then reacted for 2 hours. After the termination of the reaction, the supernatant solution was removed. The resulting reaction product was then washed with 88 ml of toluene at a temperature of 75° C. three times. Thereafter, to the reaction system were added 89 ml of toluene, 0.8 g of aluminum trichloride and 22 ml of titanium tetrachloride. The reaction system was then reacted with stirring at a temperature of 100° C. for 1.5 hours. Subsequently, the resulting product was washed with 83 ml of n-heptane of 40° C. 8 times to obtain a solid catalyst component. The solid catalyst component was then measured for Ti content. The results were 2.5% by weight. The solid catalyst component also exhibited Al content of 0.8% by weight.

<Preparation of Polymerization Catalyst and Polymerization>

The propylene polymerization procedure of Example 1 was followed except that cyclohexylcyclopentyldimethoxysilane was used instead of cyclohexylmethyldimethoxysilane. The propylene homopolymer thus obtained was then evaluated. The results are set forth in Table 1.

EXAMPLE 4

<Preparation of solid catalyst component>

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride of room temperature. The reaction system was heated with stirring to a temperature of 50° C. where it was then reacted. Subsequently, to the reaction system was added 5.2 ml of di-iso-octyl phthalate. The reaction system was further heated to a temperature of 70° C. where 0.2 ml of diethyl phthalate was added thereto and then 4.0 ml of a dimethyl polysiloxane which has a viscosity of 100 cSt at room temperature was added thereto. The reaction system was heated to a temperature of 112° C. where it was then reacted for 2 hours. After the termination of the reaction, the supernatant solution was removed. The resulting reaction product was then processed with 80 ml of toluene and 20 ml of titanium tetrachloride at a temperature of 100° C. for 15 minutes. The reaction product was then washed with 100 ml of toluene three times. Thereafter, to the reaction system were added 0.8 g of tri-iso-propoxyaluminum, 80 ml of toluene and 20 ml of titanium tetrachloride. The reaction system was then reacted with stirring at a temperature of 100° C. for 2 hours. Subsequently, the resulting product was washed with 100 ml of n-heptane of 40° C. 8 times to obtain a solid catalyst component. The solid catalyst component was then measured for Ti content. The results were 4.2% by weight. The solid catalyst component also exhibited Al content of 1.1% by weight.

<Preparation of Polymerization Catalyst and Polymerization>

The polymerization catalyst preparation procedure and propylene polymerization procedure of Example 1 were followed except that the solid catalyst component thus obtained was used. The propylene homopolymer thus obtained was then evaluated. The results are set forth in Table 1.

EXAMPLE 5

<Preparation of Solid Catalyst Component>

Into a 500-ml round flask equipped with an agitator in which the air within had been thoroughly replaced by nitrogen gas were charged 10 g of diethoxymagnesium and 80 ml of toluene to make a suspension. Into the flask was then charged 20 ml of titanium tetrachloride of room temperature. The reaction system was heated with stirring to a temperature of 50° C. where it was then reacted. Subsequently, to the reaction system was added 5.2 ml of di-iso-octyl phthalate. The reaction system was further heated to a temperature of 70° C. where 0.2 ml of diethyl phthalate was added thereto and then 4.0 ml of a dimethylpolysiloxane which has a viscosity of 100 cSt at room temperature was added thereto. The reaction system was heated to a temperature of 112° C. where it was then reacted for 2 hours. After the termination of the reaction, the supernatant solution was removed. Into the flask were then charged 80 ml of toluene, 20 ml of titanium tetrachloride and 0.5 g of diethylaluminum chloride with which the reaction system was processed at a temperature of 110° C. for 30 minutes. The supernatant solution was then removed. The reaction product was then washed with 100 ml of toluene three times. Thereafter, to the reaction system were added 80 ml of toluene and 20 ml of titanium tetrachloride. The reaction system was then reacted with stirring at a temperature of 100° C. for 2 hours. Subsequently, the resulting product was washed with 100 ml of n-heptane of 40° C. 8 times to obtain a solid catalyst component. The solid catalyst component was then measured for Ti content. The results were 5.9% by weight. The solid catalyst component also exhibited Al content of 1.8% by weight.

<Preparation of Polymerization Catalyst and Polymerization>

The polymerization catalyst preparation procedure and propylene polymerization procedure of Example 1 were followed except that the solid catalyst component thus obtained was used. The propylene homopolymer thus obtained was then evaluated. The results are set forth in Table 1.

EXAMPLE 6

A solid catalyst component was prepared in the same manner as in Example 4 except that 1.0 g of triethoxyaluminum was used instead of tri-iso-propoxyaluminum. Polymerization was then effected in the presence of the solid catalyst component thus obtained. The propylene homopolymer thus obtained was evaluated. The results are set forth in Table 1.

EXAMPLE 7

A solid catalyst component was prepared in the same manner as in Example 4 except that 0.5 g of aluminum trichloride and 0.5 g of tri-iso-propoxyaluminum were used instead of tri-iso-propoxyaluminum. Polymerization was then effected in the presence of the solid catalyst component thus obtained. The propylene homopolymer thus obtained was evaluated. The results are set forth in Table 1.

EXAMPLE 8

A solid catalyst component was prepared in the same manner as in Example 2 except that dimethyl polysiloxane was not used. Polymerization was then effected in the presence of the solid catalyst component thus obtained. The results are set forth in Table 1.

COMPARATIVE EXAMPLE 1

A solid catalyst component was prepared in the same manner as in Example 1 except that neither aluminum trichloride nor dimethyl polysiloxane was used. Polymerization was then effected in the presence of the solid catalyst component thus obtained. The results are set forth in Table 1.

was then subjected to polymerization at a temperature of 70° C. for 4 hours. The pressure drop caused by the progress of polymerization was made up for by continuously supplying propylene alone. In this manner, the reaction system pres-

TABLE 1

| Properties evaluated | Examples | | | | | | | | Comparative Example 1 |
|---|---|---|---|---|---|---|---|---|---|
| | 1 | 2 | 3 | 4 | 5 | 6 | 7 | 8 | |
| Polymerization activity (Y) (g/g-cat.) | 37,500 | 43,000 | 42,000 | 27,600 | 20,500 | 22,500 | 26,300 | 29,800 | 22,800 |
| Boiling n-heptane-insoluble component content (HI) (wt %) | 96.3 | 96.8 | 96.6 | 96.8 | 96.6 | 97.2 | 96.9 | 95.8 | 99.5 |
| Melt flow rate (MFR) (g/10 min.) | 2.5 | 1.7 | 3.0 | 2.5 | 3.2 | 2.2 | 3.1 | 4.0 | 1.9 |
| Bulk density (BD) (g/ml) | 0.41 | 0.38 | 0.38 | 0.41 | 0.39 | 0.39 | 0.38 | 0.36 | 0.40 |
| Xylene-soluble component (XS) (wt %) | 3.5 | 3.0 | 3.1 | 4.2 | 4.6 | 4.3 | 4.1 | 4.0 | 2.5 |
| Isoblock content in xylene-insoluble component (IB) (mol %) | 3.3 | 3.0 | 3.7 | 3.8 | 4.2 | 3.7 | 3.6 | 3.5 | 0.9 |
| Polydispersity index (PI) | 4.5 | 4.3 | 5.0 | 4.6 | 4.7 | 4.2 | 4.3 | 4.3 | 3.4 |

EXAMPLE 9

Prepolymerization and main polymerization were effected in the presence of the solid catalyst component prepared in Example 1 to obtain a propylene homopolymer.

<Prepolymerization>

Into a 1,500 ml stainless steel autoclave equipped with an agitator the inside of which had been thoroughly dried with nitrogen gas and in which the air within had been then replaced by propylene gas was charged 300 ml of n-heptane. Into the autoclave was then introduced 50 ml of propylene gas so that propylene was dissolved in n-heptane. Subsequently, into the autoclave was charged 0.80 mmol of triethylaluminum. The mixture was then stirred for 30 minutes. Into the autoclave was then charged the foregoing solid catalyst component in an amount of 0.12 mmol as calculated in terms of Ti. Subsequently, the reaction system was subjected to polymerization at a temperature of 30° C. with stirring while propylene was being continuously introduced thereinto for 60 minutes. The amount of the polymer thus produced was 4.8 g per g of the solid catalyst component.

<Main Polymerization>

Into a 1,800 ml stainless steel autoclave equipped with an agitator the inside of which had been thoroughly dried with nitrogen gas and in which the air within had been then replaced by propylene gas was charged 700 ml of n-heptane. Into the autoclave were then charged 2.10 mmol of triethylaluminum, 0.21 mmol of cyclohexylmethyldimethoxysilane and the foregoing prepolymerization catalyst in an amount of 0.0053 mmol as calculated in terms of Ti while being kept in an atmosphere of propylene gas to form a polymerization catalyst. Thereafter, into the autoclave was charged 150 ml of hydrogen to raise the propylene pressure in the system to 1.1 MPa where the reaction system sure was kept to a predetermined value during polymerization. In accordance with the foregoing polymerization process, propylene was polymerized. The polymer thus produced was withdrawn by filtration, and then dried under reduced pressure to obtain a solid polymer which was then evaluated. The results are set forth in Table 2.

EXAMPLE 10

The propylene polymerization procedure of Example 9 was followed except that prepolymerization was effected in the presence of the solid catalyst component prepared in Example 2 and the amount of triethylaluminum used in prepolymerization was 0.20 mmol. The propylene homopolymer thus obtained was then evaluated. The results are set forth in Table 2.

EXAMPLE 11

The propylene polymerization procedure of Example 9 was followed except that prepolymerization was effected in the presence of the solid catalyst component prepared in Example 3, the amount of triethylaluminum used in prepolymerization was 3.3 mmol and the amount of the solid catalyst component used was 0.83 mmol as calculated in terms of Ti. The propylene homopolymer thus obtained was then evaluated. The results are set forth in Table 2.

EXAMPLE 12

The propylene polymerization procedure of Example 9 was followed except that prepolymerization was effected in the presence of the solid catalyst component prepared in Example 4 and 0.048 mmol of cyclohexylmethyldimethoxysilane was added after the addition of triethylaluminum during prepolymerization. The propylene homopolymer thus obtained was then evaluated. The results are set forth in Table 2.

COMPARATIVE EXAMPLE 2

Prepolymerization and main polymerization were effected in the same manner as in Example 9 except that the same solid catalyst component as used in Comparative Example 1 was used. The results are set forth in Table 2.

TABLE 2

| Properties evaluated | Examples | | | | Comparative Example 2 |
|---|---|---|---|---|---|
| | 9 | 10 | 11 | 12 | |
| Polymerization activity (Y) (g/g-cat.) | 33,300 | 29,500 | 35,100 | 32,700 | 17,300 |
| Boiling n-heptane-insoluble component content (HI) (wt %) | 97.2 | 97.1 | 96.6 | 97.2 | 99.7 |
| Melt flow rate (MFR) (g/10 min.) | 2.5 | 3.4 | 2.4 | 2.9 | 1.9 |
| Bulk density (BD) (g/ml) | 0.40 | 0.40 | 0.39 | 0.41 | 0.33 |
| Xylene-soluble component (XS) (wt %) | 3.2 | 3.0 | 3.1 | 3.5 | 2.5 |
| Isoblock content in xylene-insoluble component (IB) (mol %) | 3.6 | 3.5 | 3.9 | 4.0 | 1.0 |
| Polydispersity index (PI) | 4.7 | 4.5 | 5.2 | 4.8 | 3.5 |

Industrial Applicability

As obvious from the foregoing description, the propylene homopolymer obtained according to the present invention exhibits a melt flow rate (MFR) of from 0.1 to 20 g/10 min., less xylene-insoluble component and an extremely high isoblock content (IB) in xylene-insoluble component. Accordingly, the present invention can provide a propylene homopolymer which can be fairly worked into a sheet, film, or the like without any solution such as coexistence of ethylene as a comonomer.

What is claimed is:

1. A propylene homopolymer, having a melt flow rate (MFR) determined at a temperature of 230° C. under a load of 2.16 kg of from 0.1 to 20 g/10 min., a 23° C. xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \quad (1)$$

wherein [Pmmmr], [Pmmrr] and [Pmrrm] are the relative intensity ratio (mol %) of Pmmmr, Pmmrr and Pmrrm, respectively, which are absorption intensities attributed to isoblock chain.

2. A propylene homopolymer, obtained by the polymerization of a propylene in the presence of a solid catalyst component (A) comprising as essential components magnesium, titanium, halogen and an electron donor, an organic aluminum compound (B) and an organic silicon compound (C), having a melt flow rate (MFR) determined at a temperature of 230° C. under a load of 2.16 kg of from 0.1 to 20 g/10 min., a 23° C. xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \quad (1)$$

wherein [Pmmmr], [Pmmrr] and [Pmrrm] are the relative intensity ratio (mol %) of Pmmmr, Pmmrr and Pmrrm, respectively, which are absorption intensities attributed to isoblock chain.

3. A propylene homopolymer, obtained by the polymerization of a propylene in the presence of a catalyst comprising the following components (A), (B) and (C), having a melt flow rate (MFR) determined at a temperature of 230° C. under a load of 2.16 kg of from 0.1 to 20 g/10 min., a 23° C. a xylene-soluble component content of not more than 6% by weight and an isoblock content [IB] of at least 3 mol % as determined by the following equation (1) from Pmmmr, Pmmrr and Pmrrm, which are absorption intensities attributed to isoblock chain in xylene-insoluble component by $^{13}$C-NMR spectrum:

$$[IB]=[Pmmmr]+[Pmmrr]+[Pmrrm] \quad (1)$$

wherein [Pmmmr], [Pmmrr] and [Pmrrm] are the relative intensity ratio (mol %) of Pmmmr, Pmmrr and Pmrrm, respectively, which are absorption intensities attributed to isoblock chain:

(A) A solid catalyst component prepared from the following components (a) to (d):

(a) A magnesium compound represented by the following general formulae:

$$Mg(OR^1)_2$$

wherein $R^1$ represents a $C_{1-4}$ alkyl group or an aryl group;

(b) An aluminum compound represented by the following general formulae:

$$Al(OR^2)_m X^1_{3-m}$$

wherein $R^2$ represents a $C_{1-4}$ alkyl group or an aryl group; $X^1$ represents a halogen atom; and m represents a real number of from at least 0 to not more than 3; or $$R^3_n AlX^2_{3-n}$$

wherein $R^3$ represents a $C_{1-4}$ alkyl group; $X^2$ represents a hydrogen atom or halogen atom; and n represents a real number of from more than 0 to not more than 3;

(c) A titanium compound represented by the following general formula:

$$Ti(OR^4)_p X^3_{4-p}$$

wherein $R^4$ represents a $C_{1-4}$ alkyl group; $X^3$ represents a halogen atom; and p represents 0 or an integer of from 1 to 3; and (d) A diester of aromatic dicarboxylic acid;

(B) An organic aluminum compound represented by the following general formula:

$$R^5_q AlY_{3-q}$$

wherein $R^5$ represents a $C_{1-4}$ alkyl group; Y represents any one of hydrogen atom, chlorine atom, bromine atom and iodine atom; and q represents a real number of from more than 0 to not more than 3; and (C) An organic silicon compound represented by the following general formula:

wherein $R^6$'s may be the same or different and each represents a $C_{1-12}$ alkyl group, a cycloalkyl group, a phenyl group, a vinyl group, an allyl group or an aralkyl group; $R^7$'s may be the same or different and each represents a $C_{1-4}$ alkyl group, a cycloalkyl group, a phenyl group, a vinyl group, an allyl group or an aralkyl group; and r represents 0 or an integer of from I to 3.

4. A sheet or film, obtained by forming a propylene homopolymer according to claim 1.

5. A sheet or film, obtained by forming a propylene homopolymer according to claim 2 into the sheet or film.

6. A sheet or film, obtained by forming a propylene homopolymer according to claim 3 into the sheet or film.

* * * * *